United States Patent
Itoh et al.

[11] 3,987,394
[45] Oct. 19, 1976

[54] OPERATIONAL CIRCUITRY FOR GAS TURBINE ENGINE CONTROL

[75] Inventors: Takane Itoh, Yokohama; Takao Kamide, Zushi, both of Japan

[73] Assignee: Nissan Motor Co., Ltd., Yokohama, Japan

[22] Filed: Nov. 22, 1974

[21] Appl. No.: 526,425

[30] Foreign Application Priority Data
Nov. 28, 1973 Japan.............................. 48-132561

[52] U.S. Cl.................................. 324/160; 73/497; 324/163
[51] Int. Cl.² ......................................... G01P 3/42
[58] Field of Search ............... 324/160, 163; 73/497

[56] References Cited
UNITED STATES PATENTS
| | | | |
|---|---|---|---|
| 3,782,205 | 1/1974 | Fletcher et al. | 73/497 |
| 3,813,946 | 6/1974 | Robbins, Jr. et al. | 73/430 |

*Primary Examiner*—R. V. Rolinec
*Assistant Examiner*—Vincent J. Sunderdick

[57] ABSTRACT

A mathematical expression is converted and approximations applied to remove complex processes, simplifying the circuitry of system which controls compressor speed in dependence on ambient temperature.

1 Claim, 3 Drawing Figures

OPERATIONAL CIRCUITRY FOR GAS TURBINE ENGINE CONTROL

This invention relates to an operational circuitry for a gas turbine engine control, and more particularly to an electrical operational circuitry to modify an actual compressor rotor shaft speed into that desired by engine ambient temperature.

Before discussing in detail the present invention, reference is made to FIG. 1 wherein a typical prior art gas turbine engine is depicted schematically. An engine starter 1 drives a compressor 2 and a compressor turbine 5 through a gearing 10 and a compressor rotor shaft 8, whereby they are set into rotation and fuel is supplied to the engine upon starting. The starter 1 thereafter is disconnected by suitable means (not shown). Ambient air enters the engine and is delivered to the compressor 2. Compressed air exiting from the compressor 2 passes through a heat exchanger or a regenerator 3 where it is preheated through heat exchange by engine exhaust gases. The preheated air from the regenerator 3 is delivered to a combustion chamber 4 wherein it supports combustion of fuel. The hot combustion products from the combustion chamber 4 expand through the compressor turbine 5 thereby driving the turbine and, via a compressor rotor shaft 8 also driving the compressor 2. The gasses generated by the combustion of fuel in the combustion chamber 4, after passing through the compressor turbine 5, flow through a power turbine inlet nozzles (not shown) and thence to a power turbine 6. The gases expanding through the power turbine 6 are delivered to the regenerator 3 for cooling before exhaust and for preheating the compressed air being delivered to the combustion chamber 4. The engine output is transmitted to a power turbine output shaft 9 to rotate a load 7.

In controlling a gas turbine engine operation, one of the important engine operating parameters is the modified compressor shaft speed with respect to engine ambient temperature or the temperature of the air entering the compressor 2. To obtain the modified compressor shaft speed, the following expression has been employed:

$$N_{gg}* = N_{gg} \sqrt{T_{sd}}/\sqrt{T_1} \; (°K) \tag{1}$$

where
$N_{gg}*$: compressor shaft speed modified by engine ambient temperature
$N_{gg}*$: un-modified compressor shaft speed
$T_{sd}$: standard average engine ambient temperature in absolute
$T_1$: current ambient temperature in degrees absolute.

Conventionally, for resolving the Eq. (1) for $N_{gg}*$, employed are circuits for dividing and extracting the square root. As a consequence, to obtain satisfactory accuracy is complicated and expensive.

Hence, the present invention consists of a simple, economical, and comparatively accurate operational circuitry for a gas turbine engine control which does not require calculating means for dividing and extracting the square root. The operational circuitry in accordance with this invention is constructed on the basis of an approximate expression obtained from Eq. (1), which is discussed in detail later.

It is an object of the present invention to provide an improved electrical operational circuitry of a gas turbine engine control for controlling an un-modified compressor rotor shaft speed to that desired in accordance with engine ambient temperature.

Other objects, features, and advantages of the present invention will become more apparent or reference to the succeeding detailed description thereof, and to the accompanying drawings illustrating the preferred embodiment thereof, wherein.

The preferred embodiment of the present invention will be hereinafter described in detail. Assuming that $t_a$ and $t_{sd}$ are an ambient and average standard ambient temperatures in degrees Celsius respectively, then the absolute temperatures $T_1$ and $T_{sd}$ thereof are $$T_1 = 273 + t_a \; (°K) \tag{2}$$
$$T_{sd} = 273 + t_{sd} \; (°K) \tag{3}$$

Subtracting the latter form the former yields $$T_1 = T_{sd} + t_a - t_{sd} \; (°K) \tag{4}$$

Replacing $T_1$ in Eq. (1) gives $$N_{gg}* = N_{gg} \sqrt{\frac{T_{sd}}{T_1}}$$

$$= N_{gg} \left(\frac{T_{sd}}{T_{sd} + t_a - t_{sd}}\right)^{1/2}$$

$$= N_{gg} \left(\frac{T_{sd} + t_a - t_{sd}}{T_{sd}}\right)^{-1/2}$$

$$= N_{gg} \left(1 + \frac{t_a - t_{sd}}{T_{sd}}\right)^{-1/2}$$

$$\simeq N_{gg} \left(1 - \frac{t_a - t_{sd}}{2T_{sd}}\right)$$

$$= N_{gg} - \frac{N_{gg} t_a}{2T_{sd}} + \frac{N_{gg} t_{sd}}{2T_{sd}} \tag{5}$$

In Eq. (5), $N_{gg}$ of the second and third terms of the right hand is substituted by $N_{ggm}$ which is a median of the usually available value of $N_{gg}$. Accordingly, Eq. (5) becomes $$N_{gg}* = N_{gg} - \frac{N_{ggm} t_a}{2T_{sd}} + \frac{N_{ggm} t_{sd}}{2T_{sd}} \tag{6}$$

It is understood that the operational circuitry based on Eq. (6) is very simple compared with that based on Eq. (1) because the right hand of Eq. (6) merely involves addition, subtraction, and multiplication of a variable $t_a$ by constant $N_{ggm}/2T_{sd}$.

Figure 1:
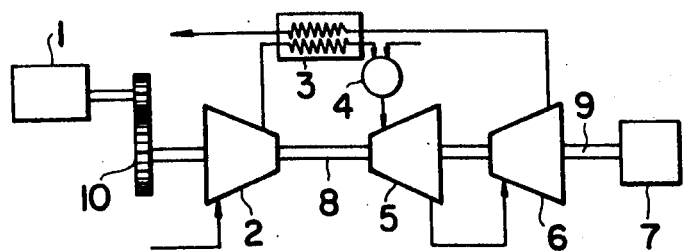
FIG. 1 illustrates, schematically, a gas turbine engine of the typical type in which the present invention is embodied.
Figure 2:
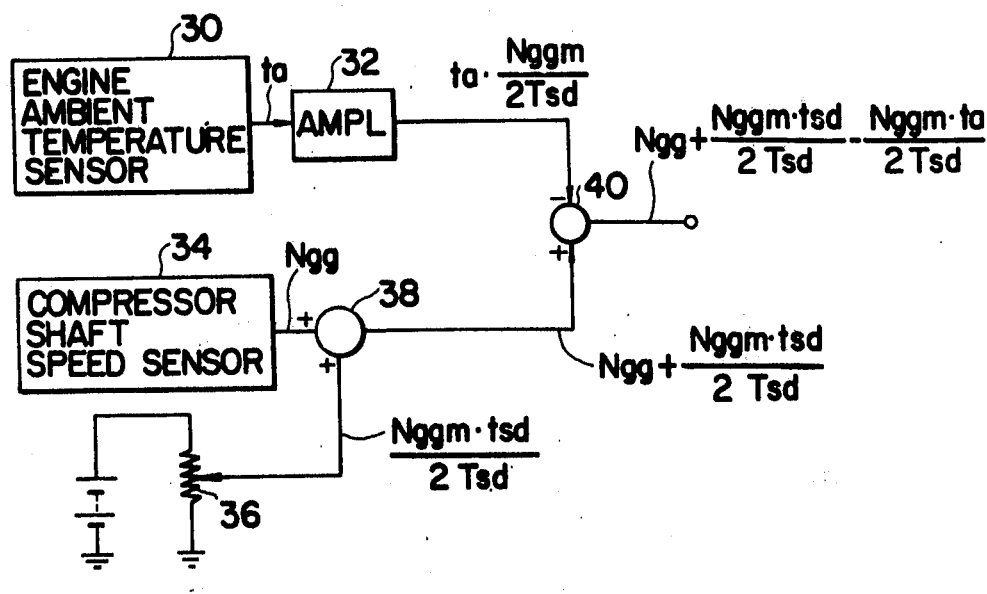
FIG. 2 illustrates, schematically, in a block diagram an operational circuitry embodying the present invention.

FIG. 2 schematically shows in a block diagram an operational circuitry for resolving Eq. (6) for $N_{gg}*$ in accordance with the present invention. A sensor 30 is mounted, for example, within an air intake portion of the compressor 2 to sense engine ambient temperature and generate an electrical signal commensurate therewith. The output of the sensor 30 is fed to an amplifier 32 and amplified therein by a factor of $N_{ggm}/2T_{sd}$, and then transmitted to a summing means 40. A sensor 34 is mounted at a suitable portion on the engine to sense the compressor shaft speed $N_{gg}$ and generate an electrical signal in proportion thereto. The output of the sensor 34 is applied to another summing means 38. On the other hand, a signal generator 36 of a suitable type for generating an electrical signal representing $N_{ggm}t_{sd}/2T_{sd}$ is provided on a suitable portion of the engine. This signal is fed to the summing means 38, wherein $N_{ggm}t_{sd}/2T_{sd}$ is added to $N_{gg}$. The summing means 40 is, then, supplied with the signals from the amplifier 32 and the summing means 38 to perform a subtraction calculation therein. As thus far described, $N_{gg}*$ of Eq. (6) is resolved by the FIG. 2 operational circuitry in accordance with the present invention.

To examine the deviations of the results obtained by Eq. (6) with respect to those by Eq. (1), the following assumptions will be made. Provided the usual operating values of $N_{gg}$ range from 20,000 to 40,000 rpm, then the median value thereof $N_{ggm}$ is 30,000 rpm. Further, assuming that the average standard engine ambient temperature $t_{sd}$ is 15° C, the absolute value thereof $T_{sd}$ becomes 288° K. Replacing these values and $T_1$ of Eq. (2) in Eqs. (1) and (6) yield respectively $$N_{gg}* = N_{gg} \sqrt{\frac{288}{273 + t_a}} \quad (7)$$

$$N_{gg}*' = N_{gg} - 52t_a + 781.25 \quad (8)$$

In this case to differentiate between the $N_{gg}$ of Eqs. (1) and (6), a prime ' is attached to the latter.

Figure 3:
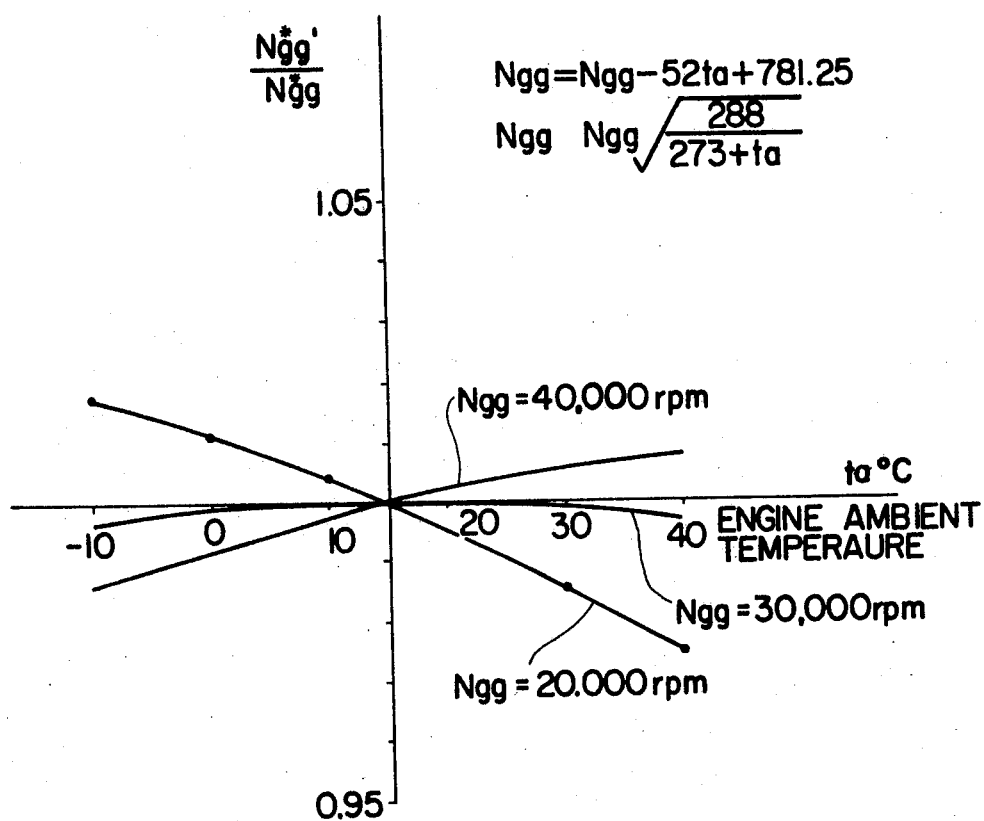
FIG. 3 illustrates, graphically, the relationship between engine ambient temperature and ratio of compressor shaft speed modified by the operational circuitry of prior art for several un-modified compressor shaft speeds.

FIG. 3 graphically illustrates the relationship between the ratio of $N_{gg}*'$ (Eq. (8)) to $N_{gg}*$ (Eq. (7)) and the engine ambient temperature $t_a$ for several values of $N_{gg}$. As seen from the graph, deviations of the results obtained by Eq. (8) (corresponds to Eq. (6)) from those of Eq. (7) (corresponds to Eq. (1)) over the range $-10° C < t_a < 40° C$ is within ±2.5%. Our empirical results prove that the deviations are negligible.

As is understood from the above description, the operational circuitry in accordance with the present invention has the advantages that it is simple in its arrangement and comparatively accurate compared with the conventional operational circuitry based on Eq. (1).

What is claimed is:

1. An electrical operational circuitry of a gas turbine engine control capable of modifying a first signal indicative of an actual compressor rotor shaft speed in accordance with engine ambient temperature, which comprises:

first means for sensing said engine ambient temperature to generate a first signal commensurate therewith;

second means for receiving said first signal to amplify it by a factor of $N_{ggm}/2T_{sd}$ and generate a second signal commensurate therewith, where $N_{ggm}$ is a median value of the available range of compressor rotor shaft speed and $T_{sd}$ is a standard average engine ambient temperature in degrees absolute;

third means for sensing said actual compressor rotor shaft speed to generate a third signal commensurate therewith;

fourth means for generating a fourth signal representing $N_{ggm}t_{sd}/2T_{sd}$, where $t_{sd}$ is a standard average engine ambient temperature in degrees Celsius;

fifth means for receiving said third and fourth signals and summing them to generate a fifth signal proportional to the sum of said third and fourth signals; and sixth means for receiving said second and fifth signals and subtracting the former from the latter to generate a sixth signal commensurate with the difference therebetween.

* * * * *